United States Patent [19]

Doyle et al.

[11] 4,001,180

[45] Jan. 4, 1977

[54] POLYURETHANE CURING AGENT

[76] Inventors: Earl N. Doyle, 1737 Campbell Road, Houston, Tex. 77055; Anna W. Crull, 6110 Cheena, Houston, Tex. 77035

[22] Filed: Feb. 27, 1975

[21] Appl. No.: 553,652

[52] U.S. Cl. .......................... 260/75 NH; 252/182; 260/2.5 AM; 260/18 TN; 260/77.5 AM
[51] Int. Cl.² .................. C08G 18/30; C08G 18/32
[58] Field of Search ............ 260/75 NH, 77.5 AM, 260/18 TN; 252/182

[56] References Cited

UNITED STATES PATENTS

| | | | |
|---|---|---|---|
| 2,432,148 | 12/1947 | Furness et al. | 260/43 |
| 3,105,062 | 9/1963 | Graham et al. | 260/75 NH |
| 3,194,793 | 7/1965 | Kogon | 260/75 NH |
| 3,429,856 | 2/1969 | Hoeschele | 260/75 NH |
| 3,629,168 | 12/1971 | Ryan | 260/75 NH |

*Primary Examiner*—H.S. Cockeram
*Attorney, Agent, or Firm*—Burns, Doane, Swecker & Mathis

[57] ABSTRACT

A new curing agent for the production of polyurethane elastomers, particularly for use at processing temperatures of from about ambient up to about 250° F is disclosed. The new curing agent is the polyfunctional (including difunctional) reaction product of methylene bis (methyl anthranilate) and from about 0.025 to about 0.1 equivalents of an isocyanate-terminated prepolymer containing from 2 to about 10 percent excess isocyanate groups. Other components including a saturated monocarboxylic acid of from 2 to about 31 carbon atoms, another diamine compound (e.g., diamino diphenyl sulfone) or a polyfunctional hydroxyl group-containing compound may be incorporated into the curing agent.

12 Claims, No Drawings

POLYURETHANE CURING AGENT

BACKGROUND OF THE INVENTION

The use of 4,4'-methylene bis (2-chloroaniline) known as "MOCA" (as described in the U.S. Pat. No. 3,188,302) as a curing agent for polyurethanes is well-known and widespread in industry, but unfortunately this compound has been found to possess certain disadvantageous features. Propbably its most serious disadvantage is its apparent carcinogenicity which has resulted in regulations by the Occupational Safety and Health Administration strictly controlling its use in polyurethane processing. The regulations are such as to effectively preclude the continued use of MOCA in many commercial polyurethane processes. A replacement for MOCA is thus necessary.

Previous attempts to replace MOCA in commercial polyurethane processing have not been commercially successful and have presented other problems. In U.S. Pat. No. 3,629,168, for example, there is disclosed a curing agent which is purported to be useful as a replacement for MOCA, which curing agent is a lower alkylene-bis (2—-carboxyaniline) such as methylene bis (methyl anthranilate) (MBMA). MBMA, however, and similar compounds have a relatively high melting point (e.g., above 275° F.) and when molten MBMA is mixed with a urethane pro-polymer at conventional curing temperatures (i.e., about 212° F.), the urethane polymerization reaction is very difficult to control. Also, introduction of a relatively high melting point (e.g., 250° or more ° F.) compound into a prepolymer melt which has a temperature of about 212° F. generally results in the crystallization of the higher melting point compound. Raising the prepolymer melt temperature in the range of about 250° F. minimizes the crystallization problem but the pot life of the prepolymer is so short (about 2 minutes with most conventional urethane prepolymers) that there is insufficient time for mixing and pouring of the prepolymer. In order to control the urethane polymerization reaction using these relatively high melting point compounds at conventional curing temperatures, it is necessary to utilize the high melting point compound such as MBMA as a dispersed solid or dispersed liquid in an appropriate liquid diluent. Both types of dispersions, however, result in an unsatisfactory process and end product. Whent dispersed into the prepolymer, the MBMA particles do not dissolve. The particles remain intact and react only around the outside of the particle so that only a small portion of the MBMA reacts to cure the prepolymer. The balance of the uncured prepolymer slowly cures on exposure to air due to the reaction of the available isocyanate groups in the prepolymer with moisture in the air. The resulting products are characterized by their poor physical properties, particularly their low tear and tensile strengths and hardness value. A urethane polymerization process utilizing these types of solutions results in very large amounts of unreacted materials thus decreasing process efficiency and increasing product recovery problems.

U.S. Pat. No. 3,681,291 suggests replacing MOCA with the reaction product of (a) a polyoxypropylene glycol or polytetramethylene ether diol having a molecular weight of from about 500 to about 3000; (b) an aromatic diol; and a particularly defined aromatic amine, in order to provide curing an ambient temperatures. The resulting polyurethane product, however, has very low tensile strengths (about 2000 psi maximum) and requires an organometallic catalyst for complete reaction.

U.S. Pat. No. 3,728,310 discloses a curing agent for isocyanate-terminated polyurethanes prepared by the acid-catalyzed reaction of 3-chloroaniline, 2,5-dichloroaniline and formaldehyde which curing agent is alleged to be a suitable substitute for MOCA. Other diamine curing agents, however, are formed from one or more diamine compounds the use of which also have been severely restricted by OSHA.

OBJECTS AND SUMMARY OF THE INVENTION

It is an object of this invention to provide a curing agent for polyurethane elastomers which provides satisfactory tensile and tear strength, hardness and other physical characteristics, a urethane polymerization process for using such curing agent and the resulting polyurethane.

It is also an object of this invention to provide a curing agent for urethane prepolymers, the use of which curing agent is not restricted by current OSHA regulations, a polyurethane polymerization process for using such a curing agent and the resulting polyurethane.

It is further an object of this invention to provide a curing agent for urethane prepolymers which can be utilized in conventional polyurethane processes without creating temperature or other reaction control problems for the resulting process and product.

It is another object of this invention to provide a curing agent for urethane prepolymers, the composition of which can be varied to cure a given urethane prepolymer to a polyurethane of varying physical properties.

It is also an object of this invention to provide a curing agent for polyurethane elastomers which can be utilized in polyurethane processes at relatively low curing temperatures of below 212° F.

It is further an object of this invention to provide a diamine curing agent for urethane prepolymers which is compatible with other diamines to provide intermediate properties which could not be achieved with a single diamine.

In one aspect of the invention, there is provided a polyfunctional curing agent for polyurethane elastomers comprising the reaction product of methylene bis (methyl anthranilate) and from about 0.025 to about 0.1 equivalents of an isocyanate-terminated prepolymer containing from about 2 to about 10 mole percent excess isocyanate groups.

In another aspect of the present invention, there is provided a process for forming a polyurethane comprising mixing a polyurethane prepolymer composition and the curing agent defined in the preceding paragraph and curing the mixture.

In still another aspect of the present invention, there is provided the polyurethane produced by the process of the preceding paragraph.

DETAILED DESCRIPTION OF THE INVENTION

The novel polyfunctional curing agent of the present invention may be prepared by reacting methylene bis (methylanthranilate) (hereinafter "MBMA") with an isocyanate-terminated prepolymer under suitable reaction conditions to form a stable partial adduct or diamine-terminated prepolymer of lower melting point. The thus-formed partial adduct may then be reacted with further amounts of the isocyanate-terminated prepolymer to form the ultimate polyurethane elastomer.

Methylene bis (methyl anthranilate) is commercially available generally as a mixture of isomers in which 5,5'-methylene bis (methyl anthranilate) predominates (e.g., is about 75 percent or more of the mixture). As used herein, the term "methylene bis (methyl anthranilate)" is intended to include the individual isomers as well as a mixture of the isomers. Methylene bis (methyl anthranilate) is a solid with a melting point in the range of from about 265° to about 285° F.

The isocyanate terminated prepolymer generally contains from about 2 to about 10, often from about 2.5 to about 4, mole percent excess isocyanate groups per molecule and can be formed by the reaction of an aromatic or aliphatic diisocyanate with a polyester, polyether, glycol or other suitable hydroxyl-group containing material with sufficient diisocyanate (relative to the hydroxylgroup containing component) to yield about 2 to about 10 mole percent excess isocyanate groups.

Preparation of isocyanate-terminated prepolymers of this type are well known in the art and is described, for example, in "Development and Use of Polyurethane Products," Doyle, published by McGraw, Hill, Inc., 1971 at pages 29 et seq. Suitable aromatic or aliphatic di-or polyfunctional diisocyanates include, for example polymethylene polyphenyl isocyanate, toluene diisocyanate (ortho-,meta-, para- or mixtures thereof), 4,4'-diphenyl diisocyanate, 4,4-diphenylene methane diisocyanate, 1,5-naphthalene diisocyanate, 4,4'-diphenyl ether diisocyanate, p-phenylene diisocyanate, ethylene diisocyanate, trimethylene diisocyanate, cyclohexylene diisocyanate, 2-chloropropane diisocyanate, 2,2'-diethylether diisocyanate, 3-(dimethylamine) pentane diisocyanate, and 1,4-tetra-chlorophenylene diisocyanate. Other suitable polyisocyanates will be apparent to those skilled in the art. Generally, suitable isocyanates have a functionality of at least 2, generally from about 2 to about 2.8, preferably from about 2 to about 2.4.

The hydroxyl group containing component which is reacted with the diisocyanate is also well known. Suitable polyesters, polyethers, glycols and the like include, for example, polyethylene adipate, succinate or glutarate, or azalate; polypropylene adipates, succinates, or glutarates; ethylene and propylene maleates; polyethylene and polypropylene glycols, polyoxyethylene and polyoxypropylene glycols, butylene glycols, butylene adipates, succinates, or glutarates, castor oils and castor oil polyols, propoxylated or ethyloxylated aromatic compounds, such as Bisphenol A, hydroquinone, resorcinol, etc., and other such hydroxyl-bearing intermediates. Many hydroxyl-bearing amines may also be utilized, such as propoxylated or ethoxylated anilines, triethanolamine, triisopropanolamine, etc. Other suitable materials of this type will be obvious to those knowledgeable in the art.

To prepare the isocyanate-terminated prepolymer utilized in the preparation of the curing agent, the diisocyanate and hydroxyl group containing materials may be reacted in any suitable manner such as by mixing with agitation, under vacuum or nitrogen, at temperatures of from about ambient up to about 200° F. or higher. Techniques of this type are well-known in the art.

Reaction of the isocyanate-terminated prepolymer and methylene bis (methyl anthranilate) to form the polyfunctional curing agent of the present invention may be performed at a temperature above the melting point of the reactants, i.e., above about 300° F, and generally in the range of from about 300° to about 325°, preferably from about 310° to about 320°,F, for a time sufficient to essentially complete the reaction, which time can be, for example, from about 5 to about 20, preferably from about 10 to about 15 minutes. The reaction is generally performed in the presence of an inert atmosphere (e.g., nitrogen or the like) or vacuum conditions (e.g., below 15 mm. Hg) with stirring of the reactants.

The proportion of reactants can vary. Generally, the isocyanate-terminated prepolymer is present in an amount of from about 0.025 to about 0.1, preferably from about 0.03 to about 0.1, mole equivalents per mole equivalent (herein after "equivalents") of methylene bis (methyl antranilate).

Other materials may be incorporated into the polyfunctional curing agent of the present invention to modify the physical properties and curing time of the curing agent or ultimate polyurethane obtained from the use of the curing agent.

For example, a saturated monocarboxylic acid having from 2 to about 31 carbon atoms may be added to the MBMA melt which is mixed with the isocyanate-terminated prepolymer. The acid-modified curing agent generally provides a longer pour time and a faster demolding time in the production of the ultimate polyurethane product. Suitable saturated monocarboxylic acids include, for example, caproic, heptanoic, caprilic, pelargonic, capric, undecylic, lauric, tridecylic, myristic, palmitic, margaric, steric, monodecylic, arachidic, behenic, lignoceric, hyenic, cerotic and mellistic acids of mixtures thereof. Lauric acid has been found to be particularly efficacious.

Although the amount of acid utilized will vary depending at least in part on the properties desired in the ultimate polyurethane product, generally the acid will be present in a mole weight from about 0.01 to about 0.1, preferably from about 0.05 to about 0.1, mole equivalents per equivalent of the methylene bis (methyl arthranilate) — isocyanate-terminated prepolymer reaction product.

The utilization of the saturated monocarboxylic acid having from 2 to about 31 carbon atoms also allows the further utilization in the polyfunctional curing agent of the present invention of a second aromatic diamine compound and particularly one which is normally incompatible with MBMA. That is, many aromatic diamines will not remain in eutetic solution with other diamines. It has been found, however, that with the addition of the above-noted acid to the MBMA, another aromatic diamine such as, for example, 4,4'-diamino-diphenyl-sulfone, m-phenylene diamine, 4,4'-methylene dianiline, benzidine, dianisidine, o-phenylene diamine, dichlorobenzidine, dibenzylamine, and the like, which are well-known in the art (see, for example, Doyle, "The Development and Use of Polyurethane Products," pages 49 to 51), and even if such other diamine is normally incompatible with MBMA, will remain in solution with the MBMA.

Generally, these other diamines are added to the melt of MBMA and the saturated acid in an amount of from about 0.05 to about 0.5, preferably from about 0.1 to about 0.3, equivalents per equivalent of MBMA. The utilization of this second aromatic diamine compound further may be used to modify the physical properties and particularly the ultimate hardness of the polyurethane ultimately formed.

Other components which may also be incorporated in the agent of the present invention to modify the properties of the ultimate polyurethane include hydroxyl group-containing polyols which are di-or polyfunctional. Compounds of this type, for example, affect the ultimate polyurethane polymer by increasing the elongation properties and provide a higher functionality product. Suitable hydroxyl group-containing polyols of this type include, for example, polyethylene adipate, succinate or glutarate, or azaleate; polypropylene adipates, succinates, or glutarates; ethylene and propylene maleates; polyethylene and polypropylene glycols, polyoxyethylene and polyoxypropylene glycols, butylene glycols, butylene adipates, succinates, or glutarates, castor oils and castor oil polyols, propoxylated or ethyloxylated aromatic compounds, such as Bisphenol A, hydroquinone, resorcinol, etc., and other such hydroxyl-bearing intermediates. Many hydroxyl-bearing amines may also be utilized, such as propoxylated or ethoxylated analines, triethanolamine, triisopropanolamine, etc. Other suitable materials of this type will be obvious to those knowledgeable in the art.

It has also been found that higher melting point polyols may be incorporated in the agent of the present invention. For example, polyols such as dibromobutene diol (melting point above 240° F), dibromoneopentyl glycol (melting point above 200° F) and tetrachloro bisphenol A and other relatively high melting point crystalline polyols which normally recrystallize on cooling, even in combination with other liquid polyols, remain in stable solution when partially reacted with the isocyanate and are thus processable at low temperatures (e.g., from about 150° to 225° F) without recrystallizing from solutiom. These higher melting point polyols are particularly useful in elastomers and foams because they add flame-retardance.

The hydroxyl group-containing polyol is also introduced into the MBMA melt prior to reaction with the isocyanate-terminated prepolymer.

While the amount of the hydroxyl group-containing polyol can vary depending upon the desired properties of the ultimate polyurethane product, generally the polyol will be present in an amount of from about 0.1 to about 0.3, preferably from about 0.1 to about 0.2, equivalents per equivalent of MBMA.

The resulting reaction product may be cooled to room temperature and stored for ultimate use or may be used while still molten. The cooled product has considerable stability (i.e., at least about 6, generally about 12, or more months) under normal prepolymer-type storage conditions and may be remelted at lower temperatures for use at conventional polyurethane processing temperatures without undergoing undesirable crystallization problems or other changes in its physical state. It may be heated and cooled repeatedly without changing its characteristics.

The curing agent of the present is polyfunctional (including difunctional) and has a functionality of 2.0 or more e.g., up to about 3 or more, and can be used to cure substantially all polyurethane prepolymers. The functionality of the curing agent can be adjusted (by adjusting the amount and functionality of the hydroxyl group-containing polyol present) to provide a curing agent of desired functionality.

The curing agent of the present invention may be utilized to form polyurethane products by conventional urethane processing. The curing agent, for example, may be heated to a temperature of from about 150° F to about 225° F, generally from about 175° F to about 200° F, (at which temperature it is molten) and introduced into a melt of the isocyanate-terminated prepolymer obtained by reacting a diisocyanate with a polyol (or hydrogen donor) as described above. Other conventional additives (e.g., pigments, dispersing agent, antioxidants, surfactants, clarifiers and the like) may be added to the melt in conventional fashion.

The curing agent of the present invention may be utilized at any convenient urethane processing temperature, preferably in the range of from about 150° to 250°, most preferably from about 175° F to about 200° F, without undesirable crystallization of the curing agent. The curing agent has satisfactory stability even at elevated temperature of about 250° F. and may be maintained at this temperature for about 12 or more hours without degradation or other undesirable physical or chemical change.

The invention is additionally illustrated in connection with the following examples which are to be considered as illustrative of the present invention. It should be understood, however, that the invention is not limited to the specific details described.

EXAMPLE I 172.7 parts by weight (p.b.w.) (1.10 equivalents) of methylene bis-(methyl anthranilate), melting point in the range of from about 265° F to about 285° F., is heated to a temperature of 320° F. under an atmosphere of nitrogen. 96.0 p.b.w. (0.1 equivalents) of a commercially available diisocyanate-terminated prepolymer made by the reaction of a polyethylene adipate and a toluene diisocyanate and containing about 4.3 mole percent excess isocyanate groups is added to the melt of methylene bis-(methyl anthranilate) and the reaction is allowed to proceed with stirring, at 320° F. After about 15 minutes, the melt is cooled to room temperature. The resulting curing agent reaction product has a functionality of 2.0 and an equivalent weight (hereinafter "E.W.") of 268.7.

This material (268.7 p.b.w.) is heated to a temperature of about 212° F. and added to a melt of 960 p.b.w. of the commercially available urethane prepolymer which is also at a temperature of about 212° F. The amount of curing agent reaction product is sufficient to yield a stoichiometric equivalent (1 to 1) of available hydrogen in the curing agent to available isocyanate in the prepolymer isocyanate groups. The resulting mixture has a pourable pot life of about 6 to 8 minutes.

The mixture is poured into a rubber mold at the 212° F. temperature. The part is demoldable in about 40 minutes. Full cure properties are developed in about 3 hours at 212° F. Various physical properties of the resulting polyurethane product are shown in the Table below.

EXAMPLE II

The curing agent and prepolymer of Example I are heated to a temperature of 150° F and mixed. The mixture has a pourable pot life of about 15 minutes and when poured into a mold at ambient temperature (about 75° F) can be demolded in about 12 hours. Full cure properties (as shown in the Table) are obtained in about 3 days.

EXAMPLE III 172.7 p.b.w. of methylene bis (methyl anthranilate) (1.1 equivalents), 48.0 p.b.w. of an isocyanate-terminated prepolymer having 4.37 percent excess isocyanate groups and formed from polyethylene adipate and toluene diisocyanate (0.05 equivalents), and 10.0 p.b.w. of lauric acid (0.05 equivalents) are heated to a temperature of 320° F., mixed and allowed to react in the manner of Example I. The curing agent has a functionality of 2.0 and an E.W. of 230.7.

A polyurethane is made in the manner of Example I utilizing this curing agent and the above-defined isocyanate-terminated prepolymer. The curing reaction goes to completion more rapidly than in Example I. The time to essentially full cure (at 212° F.) utilizing this curing agent is 2 hours as compared to 3 hours with the curing agent of Example I. Product properties obtained are shown in the Table.

EXAMPLE IV 157 p.b.w. of methylene bis (methyl anthranilate) (1.0 equivalents), 96 p.b.w. of the isocyanate-terminated prepolymer of Example III (0.1 equivalents) and 33 p.b.w. of a sorbitol adipate polyol (0.1 equivalents) are reacted in the manner of Example III. The resulting curing agent has an equivalent weight of 286.0 and a functionality of 2.25.

286 parts of this curing agent are mixed with 960 parts of the aforementioned prepolymer containing 4.3% excess NCO, to provide a 1 to 1 stoichiometry and a polyurethane elastomer is formed in the same manner as Example I. The product obtained has increased elongation properties compared to the product of Example I. Elongation and other measured physical properties are shown in the Table.

EXAMPLE V 149.45 p.b.w. of methylene bis (methyl anthranilate) (0.95 equivalents), 20.0 p.b.w. of lauric acid (0.1 equivalents) and 66.0 p.b.w. of a polyester polyol derived from sorbitol adipate (0.2 equivalents) are heated to 320° F. and mixed for about 20 minutes. 48.0 p.b.w. of the isocyanate-terminated prepolymer of Example III (0.05 equivalents) is added and the reaction continued for 15 minutes. The resulting curing agent has functionality of 2.5 and an E.W. of 283.45.

The resulting curing agent has pourable pot life of 15 minutes and is mixed with the urethane prepolymer formed from toluene diisocyanate and a polyethylene adipate containing 4.3 percent available isocyanate groups with both the curing agent and prepolymer components heated to 212° F. The mixture is poured in a mold and is demoldable in 40 minutes at 212° F. Full cure properties are achieved in about 2 hours at 212° F. The measured properties are shown in the Table.

A similar polyurethane elastomer is made by mixing the curing agent and urethane prepolymer at 200° F and pouring into molds at ambient temperatures (i.e., about 75° F.). Full cure properties are obtained in about 4 days.

EXAMPLE VI

The curing agent forming procedure of Example V is repeated using 135.64 p.b.w. of methylene bis (methyl anthranilate) (0.864 equivalents), 5.0 p.b.w. of behenic acid (0.014 equivalents), 48.0 p.b.w. of the isocyanate-terminated urethane prepolymer of Example III (0.05 equivalents), and 47.2 p.b.w. of polyoxypropylene diol (0.2 equivalents). The resulting curing agent has a functionality of 2.0 and an E.W. of 235.84.

The resulting curing agent is utilized to form a polyurethane elastomer utilizing the urethane prepolymer and procedure of Example I. The measured properties are shown in the Table.

This example is repeated utilizing 24.5 p.b.w. of dibromobutene diol (0.2 E.W.) to form a curing agent which is then utilized to form a polyurethane elastomer of similar physical properties and increased flame retardance.

EXAMPLE VII

Example V is repeated using 143.34 p.b.w. of methylene bis (methyl anthranilate) (0.913 equivalents), 10.0 p.b.w. of pelargonic acid (0.063 equivalents), 48.0 p.b.w. of the isocyanate-terminated prepolymer of Example V (0.05 equivalents) and 104.0 p.b.w. of a caprolactam polyol (0.2 equivalents). The resulting curing agent has a functionality of 2.0 and an E.W. of 305.34.

A polyurethane elastomer is made in the same manner as in Example V at 212° F. utilizing the same urethane prepolymer. As may be seen from the data in the Table, the elastomer has slightly lower tensile and tear strengths but greater elongation than the polyurethane produced in Example V.

EXAMPLE VIII

Example V is repeated using 125.6 p.b.w. of methylene bis (methyl anthranilate) (0.80 equivalents), 25.6 p.b.w. of diamino diphenyl sulfone (0.20 equivalents), 10.0 p.b.w. of lauric acid (0.05 equivalents), 48.0 p.b.w. of the isocyanate-terminated prepolymer of Example V (0.05 equivalents) and 33.0 p.b.w. of a polyester polyol (0.1 E.W.). The resulting curing agent has a functionality of 2.25 and an E.W. 242.2.

The resulting curing agent is utilized to form a polyurethane elastomer utilizing the urethane prepolymer and procedure of Example I. The measured properties are shown in the Table.

COMPARATIVE EXAMPLE A 157 p.b.w. of methylene bis (methyl anthranilate) (1.0 equivalents) is heated to a temperature of 280° F. at which it is molten and mixed into 960 p.b.w. of the isocyanate-terminated prepolymer of Example V (1.0 equivalents) which is at a temperature of 212° F. On contact with the prepolymer, considerable amounts of the MBMA crystallize out. The resulting mixture has a pourable pot life of 10 minutes. The mixture is poured in a mold and demoldable in 1 hour. Full cure properties of the polymer are achieved in 4 hours and are shown in the Table. The properties obtained are lower than those obtained in the polymer of Example V and indicate that less than the stoichiometric amount of curing agent has reacted with the prepolymer. In addition, microscopic examination of the polymer shows the presence of solid crystals of MBMA dispersed therein.

COMPARATIVE EXAMPLE B

Comparative Example A is repeated except that the prepolymer is heated to a temperature of 250° F., at which temperature the MBMA (temperature of 280° F) is added. The MBMA does not crystallize upon addition to the prepolymer but the resulting mixture has a pourable pot life of only 5 minutes which short pot life is commercially unattractive.

The mixture is poured into a rubber mold and demolded after 40 minutes. Full cure properties are achieved in 3.5 hours and are shown in the Table.

COMPARATIVE EXAMPLE C

A dispersion is made of 157 parts by weight of MBMA (1.0 equivalents) in 100 p.b.w. of dioctyl phthalate with sufficient agitation to thoroughly disperse the finely divided particles. The dispersion is added to 960 parts of the prepolymer of Example V, and mixed well. The MBMA dispersion is at ambient temperature, and the prepolymer is at 200° F (in order to reduce to a liquid enough state for mixing). The resultant mix is poured into molds at ambient temperature, and left to cure at this temperature. Pot life was observed to be one hour, forty minutes. Full cure was obtained in 7 days at ambient temperature. Upon seven days cure, samll particles of the unreacted MBMA were clearly visible in the casting.

The properties of the resulting polymer are shown in the Table. The obtained properties clearly show that most of curing mechanism occurred by moisture from the air, and little through the reaction of the MBMA. The properties also clearly show the effects of the dioctyl phthalate, which acts as a plasticizer.

It has also been shown through countless laboratory experiments that crystalline particles of aromatic diamines react very little with a prepolymer. This is because only the surface of these particles are in contact with the prepolymer, and the remaining part of the particles remain intact in the cured polymer. The rest of the curing mechanism occurs through reaction with moisture in the air.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A polyfunctional curing agent for polyurethane elastomers comprising the reaction product of methylene bis (methyl anthranilate) and from about 0.025 to about 0.1 equivalents of an isocyanate-terminated prepolymer containing from about 2 to about 10 mole percent excess isocyanate groups.

2. The polyfunctional curing agent of claim 1 wherein the curing agent is the reaction product of methylene bis (methyl anthranilate) and from about 0.03 to about 0.06 equivalents of the said prepolymer.

3. The polyfunctional curing agent of claim 1 further including from about 0.05 to about 0.1 equivalents of a saturated monocarboxylic acid having from 2 to about 31 carbon atoms.

4. The polyfunctional curing agent of claim 3 further including from about 0.05 to about 0.1 equivalents of an aromatic diamine.

5. The polyfunctional curing agent of claim 4 wherein said further aromatic diamine will not remain in eutectic solution with methylene bis(methly anthranilate) in the absence of said acid.

6. The polyfunctional curing agent of claim 1 further including from about 0.1 to about 0.3 equivalents of a polyfunctional hydroxyl group-containing compound.

7. The polyfunctional curing agent of claim 6 further including from about 0.1 to about 0.2 equivalents of a polyfunctional hydroxyl group-containing compound.

8. The polyfunctional curing agent of claim 7 wherein said hydroxy group - containing compound is a relatively high melting point crystalline polyol which when partially reacted with said isocyanate-terminated prepolymer, after melting, does not recrystallize when cooled to a temperature of betwen about 150° and 225° F.

9. A process for forming a polyurethane comprising mixing an isocyanate-terminated polyurethane prepolymer composition and the curing agent of claim 1 and curing the mixture.

10. The process of claim 9 wherein the curing is performed at a temperature of from about ambient to about 250° F.

11. The process of claim 10 wherein the curing is performed at a temperature of from about 200° to about 230° F.

12. The polyurethane of the process of claim 9.

TABLE

| Example | Prepolymer Temperature ° F | Curing agent temperature ° F | Pot Life | Demolding time | Full Cure Time | Curing temperature ° F |
|---|---|---|---|---|---|---|
| I | 212 | 212 | 6–8 min. | 40 min. | 3 hrs. | 212 |
| II | 150 | 150 | 40 min. | 12 hrs. | 3 days | ambient |
| III | 212 | 200 | 10 min. | 35 min. | 2 hrs. | 212 |
| IV | 212 | 200 | 12 min. | 45 min. | 3 hrs. | 212 |
| V | 212 | 200 | 15 min. | 40 min. | 2 hrs. | 212 |
| VI | 212 | 200 | 16 min. | 44 min. | 2 hrs. | 212 |
| VII | 212 | 200 | 15 min. | 40 min. | 2 hrs. | 212 |
| VIII | 212 | 200 | 18 min. | 45 min. | 2.5 hrs. | 212 |
| Comp. Ex. A | 212 | 280 | 10 min. | 1 hr. | 4 hrs. | 212 |
| Comp. Ex. B | 250 | 280 | 5 min. | 40 min. | 3.5 hrs. | 212 |
| Comp. Ex. C | 200 | ambient | 1 hr. 40 min. | 24 hrs. | 7 days | ambient |

| Cured Properties: Example | Shore A Hardness | Tensile Strength PSI | Modulus 100% Elong. PSI | Modulus 300% Elong. PSI | Tear Str. PSI pli Die C | Ult. Elong. | Service Temp. Min. Max. |
|---|---|---|---|---|---|---|---|
| I | 89 | 7170 | 520 | 1060 | 405 | 660 | −45 280 |
| II | 89 | 6970 | 485 | 940 | 385 | 640 | −40 275 |
| III | 90 | 7260 | 535 | 1110 | 425 | 660 | −60 300 |
| IV | 90 | 6850 | 440 | 880 | 365 | 720 | −30 300 |
| V | 90 | 7270 | 590 | 1285 | 550 | 665 | −60 300 |
| VI | 88 | 6900 | 490 | 995 | 510 | 600 | −60 280 |
| VII | 88 | 7110 | 510 | 1040 | 530 | 590 | −60 290 |
| VIII | 91 | 7090 | 570 | 1220 | 560 | 695 | −60 280 |
| Comp. Ex. A | 89 | 7110 | 500 | 995 | 400 | 665 | −45 280 |
| Comp. Ex. B | 89 | 7110 | 500 | 995 | 400 | 665 | −45 280 |
| Comp. Ex. C | 90 | 4400 | 270 | 510 | 185 | 630 | −20 275 |